US012334255B2

(12) United States Patent
Li et al.

(10) Patent No.: US 12,334,255 B2
(45) Date of Patent: Jun. 17, 2025

(54) NET SHAPE PROCESSING OF PERMANENT MAGNET BY FIELD ASSISTED SINTERING

(71) Applicant: FORD GLOBAL TECHNOLOGIES, LLC, Dearborn, MI (US)

(72) Inventors: Wanfeng Li, Novi, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 17/885,119

(22) Filed: Aug. 10, 2022

(65) Prior Publication Data

US 2024/0055168 A1 Feb. 15, 2024

(51) Int. Cl.

| | |
|---|---|
| ***H01F 7/02*** | (2006.01) |
| ***B22F 3/105*** | (2006.01) |
| ***H01F 41/02*** | (2006.01) |

(52) U.S. Cl.

CPC ................ *H01F 7/02* (2013.01); *B22F 3/105* (2013.01); *H01F 41/0266* (2013.01); *B22F 2202/05* (2013.01)

(58) Field of Classification Search

CPC ........................................................ B22F 3/105
See application file for complete search history.

(56) References Cited

U.S. PATENT DOCUMENTS

| | | | | |
|---|---|---|---|---|
| 4,202,523 | A * | 5/1980 | Radtke | B22C 3/00 249/115 |
| 9,666,361 | B2 * | 5/2017 | Takayama | H01F 1/0578 |
| 9,818,516 | B2 * | 11/2017 | Li | C22C 38/005 |
| 9,901,984 | B2 * | 2/2018 | Wang | B22F 3/24 |
| 11,229,950 | B2 | 1/2022 | Paulus et al. | |
| 11,735,359 | B2 * | 8/2023 | McCall | H01F 41/26 335/302 |
| 2016/0322136 | A1 * | 11/2016 | Kelhar | C22C 19/03 |
| 2021/0057115 | A1 | 2/2021 | Subhash et al. | |
| 2023/0307159 | A1 * | 9/2023 | Scherf | H02K 1/02 |

FOREIGN PATENT DOCUMENTS

| | | | | |
|---|---|---|---|---|
| CN | 202608160 U | | 12/2012 | |
| CN | 105632674 A | | 6/2016 | |
| KR | 20160052858 A | * | 5/2016 | B21D 37/16 |

OTHER PUBLICATIONS

English Machine Translation of KR_20160052858_A (Year: 2016).*

* cited by examiner

*Primary Examiner* — Sarang Afzali
(74) *Attorney, Agent, or Firm* — David B Kelley; Brooks Kushman P.C.

(57) ABSTRACT

Magnets having various portions of different densities and resistivities are disclosed. In a refinement, the various portions may have the same composition but different physical structures. Unique dies may be used to during processing, such as during sintering to manufacture the magnets. The die may include conductive and non-conductive surfaces that contact the green magnetic powder mixture during sintering such that the electrical current applied to the magnetic powder mixture is managed by the conductive and non-conductive surfaces to provide unique and complex magnets. Methods of manufacturing the magnets with the dies such as field assisted sintering, i.e., spark plasma sintering, are also disclosed.

16 Claims, 2 Drawing Sheets

NET SHAPE PROCESSING OF PERMANENT MAGNET BY FIELD ASSISTED SINTERING

TECHNICAL FIELD

The present disclosure relates to permanent magnets and methods of making the same. More specifically, the disclosure relates to magnets made by field assisted sintering and methods thereof.

BACKGROUND

Magnets pervade many technologies of modern life. Permanent magnets such as rare earth magnets (e.g., Nd—Fe—B) are widely used in electric machines and may be used in modern vehicles including electric vehicles and hybrid electric vehicles. For example, electric machines may include motors such as traction motors.

SUMMARY

A permanent magnet is disclosed. The permanent magnet may include a sintered magnetic body having a first portion with a first density and a second portion with a second density that is less than the first density. In a refinement, the composition of the first and second portions is the same.

A die assembly for manufacturing magnets such as in die cutting is also disclosed. The die assembly includes a first die having a first surface portion and a second surface portion. The first surface portion may transmit an electric current that is greater than the second surface portion. In a refinement, the first surface portion may be conductive, and the second surface portion may be non-conductive. The first die may be configured for electrical communication such that during use the first and second surface portions contact the magnetic body.

A method of manufacturing a permanent magnet is disclosed. The method includes providing a first die having a first surface portion and a second surface portion that is different than the first surface portion, providing a magnetic powder, contacting the first die with the magnetic powder, and applying an electrical current to the magnetic powder. In a refinement, the first surface portion may be a conductive material and the second surface portion may be an insulating material. The electrical current may be applied through the first die such that the first surface portion applies a greater current to the magnetic powder mixture than the second surface portion to form a sintered magnet having a high-density portion adjacent the first surface portion and a low-density portion adjacent the second surface portion.

DETAILED DESCRIPTION

Figure 1:
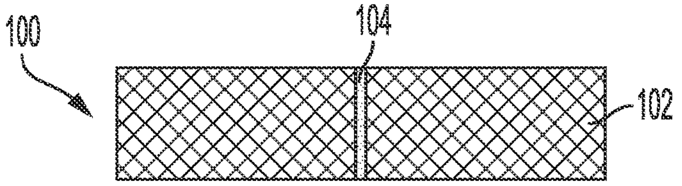
FIG. 1 is a cross-sectional side view of a magnet.

Embodiments of the present disclosure are described herein. It is to be understood, however, that the disclosed embodiments are merely examples and other embodiments can take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Unless expressly stated to the contrary, percent, "parts of," and ratio values are by weight. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "generally" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

A permanent magnet 100 having a magnetic body with a first portion 102 having a first property and a second portion 104 having a second property that is different than the first property is disclosed. In a refinement, the chemical composition of the first and second portions may be the same however, the microstructure may be different. In a variation, the magnetic body may be sintered. In a refinement, the first and second properties may be density and/or resistivity. For example, the first portion 102 may have a greater density and lower resistivity than the second portion 104 (i.e., the second portion 104 may have a lower density and greater resistivity than the first portion 102). In a variation, the permanent magnet 100 may have any other number of different portions having different densities and/or resistivities. For example, the permanent magnet 100 may have a third portion that has a third density and/or resistivity that is different than the first and second densities and/or resistivities. In yet another example, the magnet may have a fourth, fifth, and sixth portions each with a different density and/or resistivity and so on.

In a one or more embodiments, the permanent magnet may include neodymium-iron-boron (Nd—Fe—B), samarium-cobalt (SmCo), aluminum-nickel-cobalt (Al—Ni—Co), manganese-bismuth (MnBi), samarium-iron-nitrogen (SmFeN), or a combination thereof.

Figure 2A:
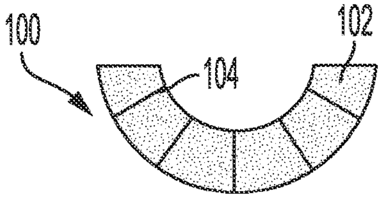
FIGS. 2A-2C are each top views of different embodiments of magnets having complex shapes with predetermined patterns of high and low-density portions.
Figure 2B:
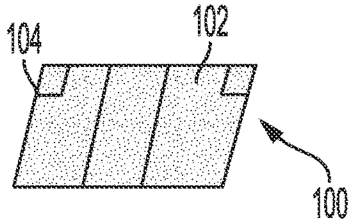
Figure 2C:
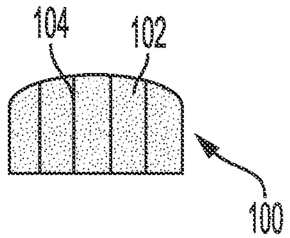

In a variation, the second portion 104 may include a plurality or series of isolated sections disposed in the first portion 102 such as shown in FIGS. 2A-2C. In a refinement, the permanent magnet 100 may include a gradient such as a density and/or resistivity gradient between the first portion 102 and the second portion 104. In other words, the transition between the first and second portions 102, 104 may not be a direct or clean switch but instead a gradual transition. For example, the transition portion or phase may decrease in density from the first portion 102 to the second portion 104 and/or increase in resistivity from the first portion 102 to the second portion 104 (i.e., the transition portion or phase may increase in density from the second portion 104 to the first portion 102 and/or decrease in resistivity from the second portion 104 to the first portion 102).

The various portions having different properties (e.g., densities and/or resistivity) may be arranged in a predetermined pattern as shown in FIGS. 2A-2C. The predetermined pattern may be optimized for superior magnetic, electric, and/or mechanical properties. A predetermined pattern may be applied or arranged in magnets having complex shapes as shown in FIGS. 2A-2C. In a refinement, the magnetic body may define one or more gaps and the second portion 104 having a lower density and/or resistivity may be disposed at or along the periphery of the gap. In a variation, the second portion 104 having a lower density and/or resistivity is disposed at or along one or more edges of the magnet 100.

In a one or more embodiments, the density of the first portion 102 may be at least 85% of theoretical density, or more preferably at least 90%, or even more preferably at least 95%, or still even more preferably at least 97%. For example, the density of the first portion 102 may be at least 98% of the theoretical density. The density of the second portion 104 may be no more than 85% of the theoretical density, or more preferably no more than 80%, or even more preferably no more than 75%. For example, the density of the first portion 102 may be at least 6.6 $g/cm^3$, or more preferably at least 6.8 $g/cm^3$, or even more preferably at least 7.2 $g/cm^3$ and the second portion 104 is no more than 6.6 $g/cm^3$, or more preferably no more than 6.2 $g/cm^3$, or even more preferably no more than 5.8 $g/cm^3$. For instance, the first portion 102 may have a density of at least 7.3 $g/cm^3$ and a second portion of no more than 6.3 $g/cm^3$. In a refinement, the first and second portions 102, 104 may have the same composition despite having different densities and/or resistivities. In yet another embodiment, the density of the first portion 102 may be at least 7.6 $g/cm^3$, or more preferably at least 8.0 $g/cm^3$, or even more preferably at least 8.2 $g/cm^3$ and the second portion 104 is no more than 7.6 $g/cm^3$, or more preferably no more than 7.2 $g/cm^3$, or even more preferably no more than 6.8 $g/cm^3$.

In one or more embodiments, the first portion 102 may have a resistivity of no more than $1.5\times10^{-6}$ Ω·m, or even more preferably no more than $1.4\times10^{-6}$ Ω·m, or even more preferably no more than $1.3\times10^{-6}$ Ω·m and the second portion 104 may have a resistivity of at least $1.4\times10^{-6}$ Ω·m, or more preferably at least $1.5\times10^{-6}$ Ω·m, or even more preferably at least $1.6\times10^{-6}$ Ω·m. In yet another embodiment, the first portion 102 may have a resistivity of no more than $0.8\times10^{-6}$ Ω·m, or more preferably no more than $0.7\times10^{-6}$ Ω·m, or even more preferably no more than $0.6\times10^{-6}$ Ω·m and the second portion 104 may have resistivity of at least $0.8\times10^{-6}$ Ω·m, or more preferably at least $0.9\times10^{-6}$ Ω·m, or even more preferably at least $1.0\times10^{-6}$ Ω·m.

Figure 3:
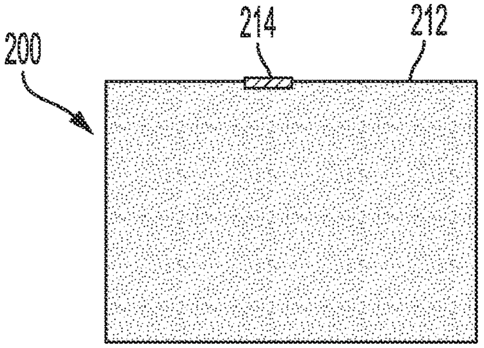
FIG. 3 is a die for making a magnet.
Figure 6:
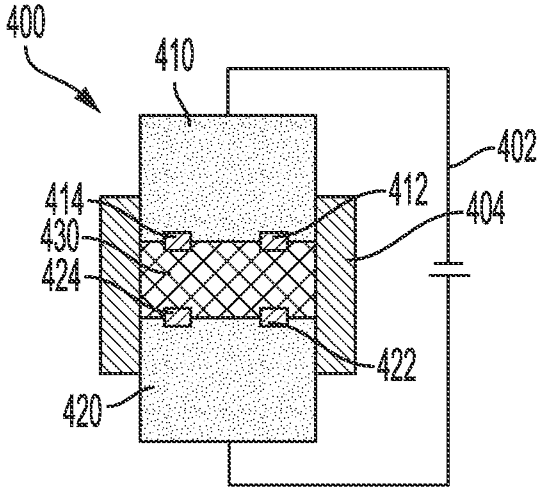
FIG. 6 is a system for making a permanent magnet.
Figure 7:
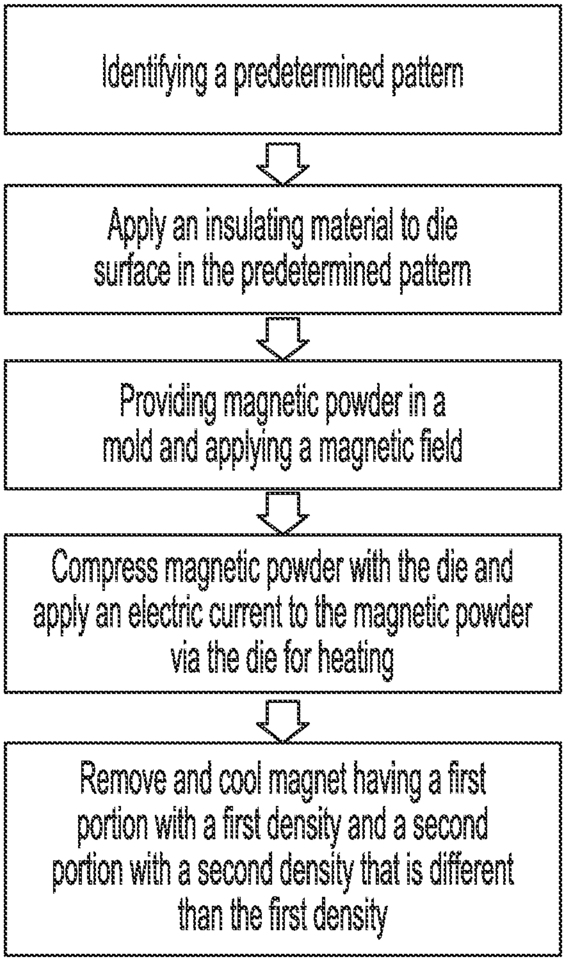
FIG. 7 is a flow chart for a method of making a permanent magnet.

Conventionally, magnets may be die cut and or machined to achieve a particular shape and size. However, conventional shaping/processing technologies such as machining add expense and reduce efficiency by, for example, reducing manufacturing output. In some embodiments, the magnets described herein may be made with one or more dies 200, as shown in FIG. 3. The one or more dies 200 may be used to form the magnet such as during sintering. For example, the one or more dies 200 may be used in a sintering system 400 such as in FIG. 6. In a refinement, the one or more dies 200 may be in electrical communication with an electrical circuit 402 such that field assisted sintering, i.e., spark plasma sintering may be performed. For example, a first die 410 and a second die 420 may be used. In a refinement, at least one, some of, or all of the dies may have a first surface portion 212 and a second surface portion 214. For example, a pair of dies 410, 420 each having a first surface portion 212 and a second surface portion 214 that is different than the first surface portion 212 may be used. In yet another example, a sintering system 400 has a first upper die 410 with a first surface portion 412 and a second surface portion 414 and a second lower die 420 with a third surface portion 422 and a fourth surface portion 424. In a refinement, the first surface portion 412 may be aligned opposite the third surface portion 422 and the second surface portion 414 may be opposite the fourth surface portion 424. For example, the third surface portion 422 may be directly opposite the first portion 412 and the fourth surface portion 424 may be directly opposite the second surface portion 414.

The surface portions may be configured to contact a magnetic powder mixture 430 and/or a permanent magnetic. In a refinement, the first surface portion 212 may be conductive and/or have a low resistivity and the second surface portion 214 may be non-conductive/less conductive and/or have a higher resistivity. For example, the first surface portion 212 may have a higher conductivity and lower resistivity than the second surface portion 214 (i.e., the second surface portion 214 may have a lower conductivity and high resistivity than the first surface portion 212).

In a variation, the second surface portion may be an insulating material such as $Al_2O_3$, $ZrO_2$, and/or BN. In one or more embodiments, any suitable insulating material for high temperature applications may be used. In a refinement, the insulating material may be provided as fine sized particles. For example, the particle size of the insulating material may be no more than 5 μm, or more preferably no more than 1 μm, or even more preferably no more than 750 nm, or still even more preferably no more than 500 nm. In one or more embodiments, an aerosol of the insulating material may be used to apply the insulating material (e.g., an insulating coating) to the surface. In a variation, an aerosol may be formed by mixing the insulating powder with solvents such as ethanol and/or acetone.

In a refinement, the first surface portion 212 has a conductivity of at least $1\times10^6$ S/m, or more preferably at least $5\times10^6$ S/m, or even more preferably $15\times10^6$ S/m and the second surface portion 214 has a conductivity or no more than $1\times10^6$ S/m, or more preferably no more than $1\times10^5$ S/m, and even more preferably no more than $10^4$ S/m. For example, the first surface portion may be graphite.

In one or more embodiments, the resistivity of the first surface portion 212 may be no more than $1\times10^{-6}$ Ω·cm, or more preferably no more than $1\times10^{-7}$ Ω·cm, or even more preferably no more than $1\times10^{-8}$ Ω·cm and the second surface portion may have a resistivity of at least $1\times10^{-8}$ Ω·cm, or more preferably at least $2.5\times10^{-8}$, or even more preferably at least $1\times10^{-7}$ Ω·cm.

Figure 4A:
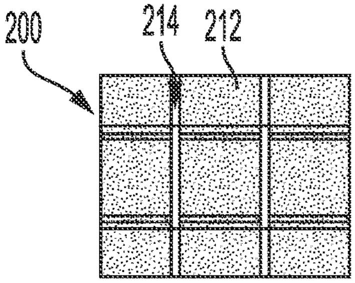
FIGS. 4A-4C are each a top view of different embodiments of die surfaces having predetermined patterns of first and second portions.
Figure 4B:
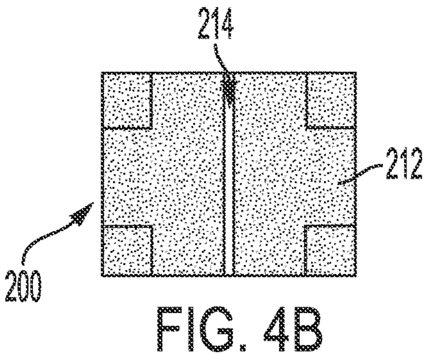
Figure 4C:
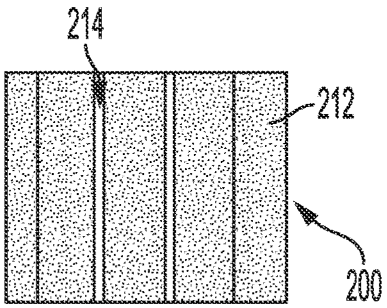
Figure 5:
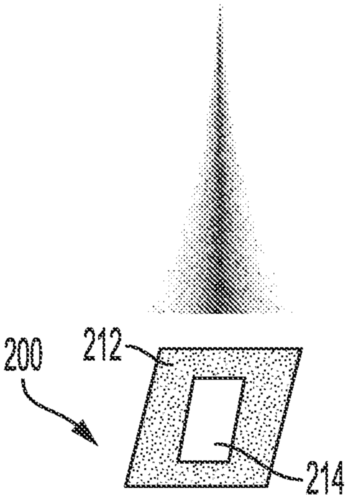
FIG. 5 is an insulating material being applied to a die.

The second surface portion 214 (e.g., insulating material) may be embedded in the surface or applied to the surface as a coating. For example, if continuous repeated use is desired, a die having an embedded second surface portion 214 may be preferred, but if flexibility is required and the magnet design (e.g., predetermined pattern) is frequently changed, the second surface portion 214 may be applied to the first surface portion 212 in the predetermined pattern. The insulating material or coating may then be removed as needed and a new predetermined pattern may be applied. For example, a first predetermined pattern of insulating material such as shown in FIG. 4A may be applied to the die and a first magnet may be manufactured. Then, the first predetermined pattern may be removed and a second predetermined pattern such as shown in FIGS. 4B-C that is different from the first predetermined pattern may be applied to the die. The die may then be used to make a second magnet that is different from the first magnet although, for example, the compositions may be the same. In a refinement, the first and second predetermined patterns may be applied by a spray application as shown in FIG. 5.

In one or more embodiments, the insulating material may be a fine powder of any suitable insulating material for high temperature conditions such as aluminum oxide ($Al_2O_3$), zirconium oxide ($ZrO_2$), and/or boron nitride (BN). Different patterns may be used to change, optimize, enhance, or emphasize different mechanical, electrical, and/or magnetic properties. For example, wider portions of the generally 2-D surface of the die may result in deeper second portions having lower densities and/or higher resistivities in the final 3-D magnet, alternatively, the insulating material may arranged to cause gaps or even complete cuts in the magnet.

In one or more embodiments, the dies described herein may be used to make the magnets described herein such as in a sintering process 500. The magnets may be made from a magnetic mixture 430. The magnetic mixture 430 may include ferromagnetic materials that are consolidated or fixed in a state to align their microstructures. For example, the magnetic powders may be aligned in a magnetic field, pressed, and/or sintered under a magnetic and/or electric field. The sintering process 500 may be field assisted sintering, i.e., spark plasma sintering. The magnetic powder mixture 430 may include neodymium-iron-boron (Nd—Fe—B), samarium-cobalt (SmCo), aluminum-nickel-cobalt (Al—Ni—Co), manganese-bismuth (MnBi), samarium-iron-nitrogen (SmFeN), or a combination thereof.

The magnetic powder mixture 430 may be added to a mold 404 of a sintering system 400. One or more dies may cooperate with the mold 404 to compress (i.e., apply pressure to) the magnetic powder mixture 430. The magnetic powder mixture 430 may also be exposed to heating and/or an electrical field such as through the one or more dies. For example, an electrical current may be applied through conductive portions of an upper die 410 through the magnetic powder mixture 430 and a lower die 420. The electric current may heat the magnetic mixture to cause sintering which results in contraction of magnetic mixture. In a refinement, the magnetic field may be applied in any direction such as in a direction that is generally perpendicular or parallel to the contact surface of the die such that an anisotropic magnet is formed.

Spark plasma sintering may result in faster heating and shorter sintering durations to achieve full density with lower compression pressures. Altering the electric field applied during sintering may result in unique properties and add design flexibility. For example, where high current is applied to the magnetic powder mixture 430, contraction may occur to increase the density and where no and/or low current is applied to the magnetic powder mixture 430 may not contract and/or may even diffuse away to adjacent regions where high current is applied. High-density portions may have lower resistivities and low-density portions may have higher resistivities. The contraction may even occur to a degree that one or more gaps are formed. The difference in current experienced between adjacent portions of the magnetic powder mixture may result in a gradient in density and/or resistivity from the portions exposed to higher currents and the portion exposed to lower currents. The methods described herein allow manufacturing flexibility, reduce expense, and maintain or enhance efficiency when producing various magnets with complex shapes.

Accordingly, a method 500 of manufacturing a permanent magnet includes providing one or more dies (e.g., a first die, a second die, and/or a plurality of dies) as described herein, providing a magnetic powder mixture in a mold, contacting the first die with the magnetic powder, and applying pressure and an electrical current to the magnetic powder. In a refinement, the first die may have a first surface portion and a second surface portion that is different than the first surface portion. In some embodiments, a greater electrical current may pass through the first surface portion than passes through the second surface portion. In a refinement, the electrical current may measure as an electrical current density. For example, the first surface portion may have a greater electrical current density than the second surface portion (i.e., the second surface portion may have a lower electrical current density than the first surface portion). For example, the first surface portion may be conductive while the second surface portion may be insulating. In a refinement, the second surface portion may be applied to the die as a coating prior to contacting it with the magnetic powder. For example, a predetermined pattern may be identified and an insulating material may be applied such as by spray coating it to form the second surface portions. In a variation, the electrical current may be applied through the first die to the magnetic powder and to a second die. The second die may be contacted with the magnetic mixture. When an insulating surface of the first die and an insulating surface of the second die are aligned and of a sufficient width and thickness they may result in a cut through the entire thickness of the magnet. Alternatively, the insulating surfaces may be arranged to form a gap or portions with lower densities and higher resistivities. In other words, high-density portions of the magnet may be adjacent more conductive surfaces of the one or more dies and low-density portions or gaps of the magnet may be formed adjacent the less conductive (e.g., insulating) surfaces of the one or more dies.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of manufacturing a permanent magnet, the method comprising:

exposing a magnetic powder to a magnetic field;

contacting a first die having a first conductive surface portion and a first insulating surface portion with the magnetic powder at a first pressure;

contacting a second die with the magnetic powder opposite the first die, the second die having a second conductive surface portion and a second insulating surface portion such that the second insulating surface portion is opposite the first insulating surface portion; and applying an electrical current to the magnetic powder through the first die such that the first conductive surface portion applies a greater electrical current density than the first insulating surface portion to form a sintered magnet having a first high-density portion adjacent the first conductive surface portion and between the first and second conductive surface portions, and a first low-density portion adjacent the first insulating surface portion and between the first and second insulating surface portions, wherein forming the first low-density portion includes forming a gap between the first and second insulating surface portions.

2. The method of claim 1, wherein the sintered magnet includes a first portion having a first density and a second portion having a second density that is less than the first density, wherein a composition of the first and second portions is same.

3. The method of claim 2, wherein the second portion is along a periphery of a gap.

4. The method of claim 2, wherein the second portion is along an edge of the magnet.

5. The method of claim 1, wherein the first density is at least 85% of a theoretical density and the second density is no more than 85% of the theoretical density.

6. The method of claim 2, wherein the first density is at least 6.6 g/$cm^3$ and the second density is no more than 6.6 g/$cm^3$.

7. The method of claim 2, wherein the second portion includes a plurality of isolated sections disposed within the first portion.

8. The method of claim 2, further comprising a third portion having a third density that is different than the first and second densities.

9. The method of claim 2, wherein the second portion is arranged in a predetermined pattern.

10. The method of claim 2, wherein the first portion is Nd—Fe—B, Sm—Co, Al—Ni—Co, MnBi, Sm—Fe—N, or a combination thereof.

11. The method of claim 1, wherein the first conductive surface portion has a conductivity of at least $1\times10^6$ S/m and the first insulating surface portion has a conductivity of no more than $1\times10^6$ S/m.

12. The method of claim 1, wherein the first conductive surface portion and the first insulating surface portion are in a predetermined pattern.

13. The method of claim 1, wherein the first insulating surface portion includes an insulation coating applied in a predetermined pattern.

14. The method of claim 1, wherein the sintered magnet has a region having a gradient density disposed between the first high-density portion and the first low-density portion.

15. The method of claim 1, wherein the first and second insulating surface portions are an insulating layer applied on the first die and second die in a predetermined pattern.

16. The method of claim 15, wherein the first and second insulating surface portions are formed by spraying $Al_2O_3$, $ZrO_2$, and/or boron nitride particles on the first die and the second die.

* * * * *